United States Patent
Xiao et al.

(10) Patent No.: US 9,123,939 B2
(45) Date of Patent: Sep. 1, 2015

(54) ANODES INCLUDING MESOPOROUS HOLLOW SILICON PARTICLES AND A METHOD FOR SYNTHESIZING MESOPOROUS HOLLOW SILICON PARTICLES

(71) Applicant: GM Global Technology Operations LLC, Detroit, MI (US)

(72) Inventors: Qiangfeng Xiao, Sterling Heights, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 13/828,755

(22) Filed: Mar. 14, 2013

(65) Prior Publication Data

US 2014/0272573 A1 Sep. 18, 2014

(51) Int. Cl.
*H01M 4/134* (2010.01)
*H01M 4/04* (2006.01)
*H01M 4/1395* (2010.01)
*H01M 4/38* (2006.01)
*H01M 4/62* (2006.01)

(52) U.S. Cl.
CPC .............. *H01M 4/134* (2013.01); *H01M 4/049* (2013.01); *H01M 4/1395* (2013.01); *H01M 4/386* (2013.01); *H01M 4/621* (2013.01); *H01M 4/625* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2008/0261116 A1* | 10/2008 | Burton et al. | 429/231.8 |
| 2009/0186267 A1 | 7/2009 | Tiegs | |
| 2011/0159365 A1* | 6/2011 | Loveness et al. | 429/218.1 |
| 2011/0278506 A1* | 11/2011 | Toyokawa | 252/503 |
| 2012/0088155 A1* | 4/2012 | Yushin et al. | 429/217 |
| 2012/0219858 A1* | 8/2012 | Nakabayashi et al. | 429/219 |
| 2014/0329150 A1* | 11/2014 | de Guzman et al. | 429/231.8 |

OTHER PUBLICATIONS

Buchel, G., et al., "A Novel Pathway for Synthesis of Submicrometer-Size Solid Core/Mesoporous Shell Silica Spheres", Advanced Materials, 1998, 10, No. 13, pp. 1036-1038.

* cited by examiner

*Primary Examiner* — Patrick Ryan
*Assistant Examiner* — Wyatt McConnell
(74) *Attorney, Agent, or Firm* — Dierker & Associates, P.C.

(57) ABSTRACT

Anodes including mesoporous hollow silicon particles are disclosed herein. A method for synthesizing the mesoporous hollow silicon particles is also disclosed herein. In one example of the method, a silicon dioxide sphere having a silicon dioxide solid core and a silicon dioxide mesoporous shell is formed. The silicon dioxide mesoporous shell is converted to a silicon mesoporous shell using magnesium vapor. The silicon dioxide solid core, any residual silicon dioxide, and any magnesium-containing by-products are removed to form the mesoporous, hollow silicon particle.

7 Claims, 6 Drawing Sheets

ANODES INCLUDING MESOPOROUS HOLLOW SILICON PARTICLES AND A METHOD FOR SYNTHESIZING MESOPOROUS HOLLOW SILICON PARTICLES

BACKGROUND

Secondary, or rechargeable, lithium ion batteries are often used in many stationary and portable devices such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium ion batteries to undergo repeated power cycling over their useful lifetimes makes them an attractive and dependable power source.

SUMMARY

Anodes including mesoporous hollow silicon particles are disclosed herein. A method for synthesizing the mesoporous hollow silicon particles is also disclosed herein. In one example of the method, a silicon dioxide sphere having a silicon dioxide solid core and a silicon dioxide mesoporous shell is formed. The silicon dioxide mesoporous shell is converted to a silicon mesoporous shell using magnesium vapor. The silicon dioxide solid core, any residual silicon dioxide, and any magnesium-containing by-products are removed to form the mesoporous, hollow silicon particle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A, 1C and 1D together illustrate an example of a method for synthesizing a mesoporous, hollow silicon particle, where

DETAILED DESCRIPTION

The high theoretical capacity (e.g., 4200 mAh/g) of silicon renders it desirable for use as a negative electrode material in lithium ion batteries. However, it has been found that the large volume change (e.g., 280%) experienced by the negative electrode material during charging/discharging of the lithium ion battery causes silicon particles (used as at least one negative electrode material) to fracture and/or decrepitate, which results in a loss of electrical contact and poor life cycling. The method disclosed herein results in the formation of mesoporous, hollow silicon particles which have a large surface area (i.e., $\geq 10$ m$^2$/g) and a sufficient amount of free space to accommodate the large volume change during charging/discharging. In an example, the hollow interior/core of the mesoporous, hollow silicon particle may have a surface coating layer (i.e., a mechanical clamping layer) established thereon that will keep the particle from expanding outward and will allow the particle to expand within itself (e.g., into the hollow core). As such, the method disclosed herein results in silicon particles that are able to withstand multiple charging/discharging cycles, thus improving the cycling life of the lithium ion battery.

Figure 1A:
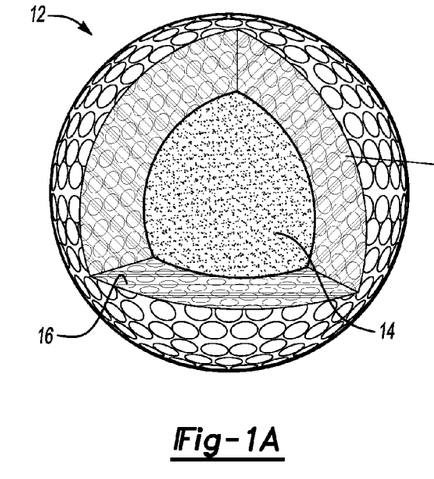
FIG. 1A is an enlarged, perspective, schematic view of a silicon dioxide sphere having a silicon dioxide solid core and a silicon dioxide mesoporous shell.
Figure 1B:
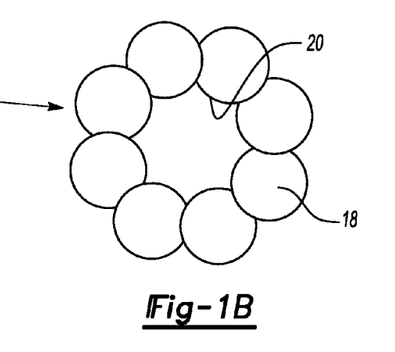
FIG. 1B is an enlarged, perspective, schematic view of a portion of the silicon dioxide mesoporous shell of FIG. 1A including silicon dioxide nanoparticles and a pore.
Figure 1C:
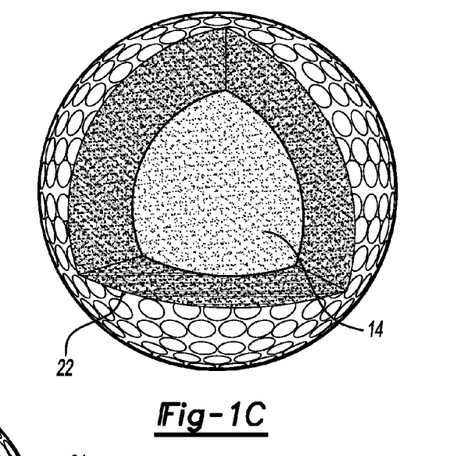
FIG. 1C is an enlarged, perspective schematic view of a sphere having a silicon dioxide solid core and a silicon mesoporous shell, and FIG. 1D an enlarged, perspective, schematic view of the mesoporous, hollow silicon particle.
Figure 1D:
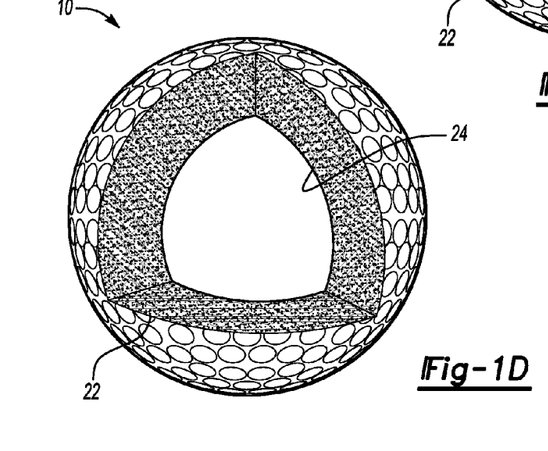

Referring now to FIGS. 1A, 1C, and 1D, an example method for synthesizing a mesoporous, hollow silicon particle 10 (shown in FIG. 1D) is schematically depicted. In FIG. 1A the shell 16 is made up of a plurality of primary silicon dioxide nanoparticles (reference numeral 18, shown in FIG. 1B) and pores (reference numeral 20, shown in FIG. 1B) formed between the nanoparticles. Similarly, the shell 22 shown in FIGS. 1C and 1D is made up of a plurality of silicon nanoparticles and pores formed between the silicon nanoparticles. It is to be understood that the particles and pores are shown schematically in these figures. In reality, the particles throughout the shell 16 have similar sizes and the pores throughout the shell 16 have similar sizes. Similarly, the particles throughout the shell 22 have similar sizes and the pores throughout the shell 22 have similar sizes.

FIG. 1A depicts a silicon dioxide ($SiO_2$) sphere 12 having a silicon dioxide solid core 14 and a silicon dioxide mesoporous shell 16. The silicon dioxide solid core 14 has a diameter ranging from about 200 nm to about 1.5 μm. As mentioned above and as will be described further herein, the silicon dioxide mesoporous shell 16 is made up of primary silicon dioxide nanoparticles 18 (shown in FIG. 1B). Each of these nanoparticles 18 has a diameter ranging from about 2 nm to about 30 nm.

The silicon dioxide sphere 12 may be synthesized via any suitable method. In an example, the silicon dioxide sphere 12 is made using a tetraethoxysilane/porogen mixture and a suspension of non-porous silicon dioxide spheres. One suitable porogen for this example method is n-octadecyltrimethoxysilane.

The suspension of non-porous silicon dioxide spheres may be made by mixing absolute ethanol, deionized water, and aqueous ammonia to form a liquid mixture, heating the liquid mixture to about 303K, and then adding tetraethoxysilane to the liquid mixture. The tetraethoxysilane/porogen mixture is added to the suspension, and this mixture is maintained at ambient temperature for a predetermined time. During this time period, simultaneous hydrolyzation and condensation of the tetraethoxysilane and the porogen take place. Any solvent may be removed (e.g., via evaporation), and then the porogen may be removed (e.g., via calcination).

This process results in the formation of the silicon dioxide mesoporous shell 16 on the silicon dioxide solid core 14. The shell 16 is made up of the silicon dioxide nanoparticles 18 and pores 20 formed between the nanoparticles 18, as shown, for example, in FIG. 1B. It is to be understood that the pores 20 are formed in the outer shell 16 alone, and the solid core 14 remains dense and non-porous.

The shape of the pores 20 depends, at least in part upon the nature of the porogen that is used. Furthermore, the concentration of the porogen in the initial tetraethoxysilane/porogen mixture enables control over the specific surface area (BET) of the silicon dioxide mesoporous shell 16, the pore volume of the silicon dioxide mesoporous shell 16, and the average pore diameter. In general, an increase in the porogen concentration results in an increased specific surface area, an increased pore volume, and an increased average pore diameter. As an example, the average diameter of the pores 20 may be controlled within the range of about 2 nm to about 30 nm. In another example, the average diameter of the pores 20 is about 3.5 nm.

The silicon dioxide mesoporous shell 16 is then converted to a silicon mesoporous shell 22, as shown in FIG. 1C. The conversion involves a size dependent reaction, which reduces the primary silicon dioxide nanoparticles 18 to silicon nanoparticles using magnesium vapor. It is to be understood that if any of the solid core 14 is converted during this step, the amount that is converted is negligible. The size dependent reaction is based upon a diffusion equation, $t=x^2/q_iD$, where t is a diffusion time; x is a mean diffusion distance; $q_i$ is a numerical constant selected from 2 for 1-dimensional diffusion, 4 for 2-dimensional diffusion, or 6 for 3-dimensional diffusion; and D is the diffusion coefficient of a magnesium atom. The mean diffusion distance (x) in the examples disclosed herein refers to the diameter of the silicon dioxide solid core 14 and the diameter of the primary nanoparticles 18 making up the silicon dioxide mesoporous shell 16, respectively. It is to be understood that the diffusion coefficient may be cancelled out when the reaction rate of the primary nanoparticles 18 is compared with that of the solid core 14. Since the diameter of the solid core 14 is much larger than the diameter of the primary nanoparticles 18 of the mesoporous shell 16, the conversion of the primary nanoparticles 18 to silicon may be accomplished while the conversion of the solid core 14 is negligible (if occurring at all). The conversion of the silicon dioxide mesoporous shell 16 to the silicon mesoporous shell 22 may be accomplished by exposing the silicon dioxide sphere 12 to the magnesium vapor.

The conversion may take place at a temperature ranging from about 620° C. to about 680° C. In an example, a magnesium powder may be heated to a temperature within the given range (i.e., ranging from about 620° C. to about 680° C.), and the magnesium vapor will be generated. The conversion may also take place in an inert gas atmosphere, such as argon gas.

After the silicon dioxide mesoporous shell 16 is converted to the silicon mesoporous shell 22, the silicon dioxide solid core 14, any residual silicon dioxide and/or magnesium, and any magnesium by-products (e.g., $Mg_2Si$) are removed. Removal may be accomplished using a combination of acid washing and acid etching. In an example, acid washing is accomplished with a 5 wt % acetic acid solution and acid etching is accomplished with a 1 wt % hydrofluoric acid solution.

After removal, the mesoporous, hollow silicon particle 10 shown in FIG. 1D is formed. This particle 10 includes a hollow core 24 and the silicon mesoporous shell 22. The diameter of the hollow core 24 corresponds with the diameter of the solid core 14 that previously occupied the volume of the hollow core 24. As such, the diameter of the hollow core 24 ranges from about ranging from about 200 nm to about 1.5 µm. This hollow space contributes to the ability of the particle 10 to accommodate the volume change during charging/discharging.

It is to be understood that the silicon mesoporous shell 22 is not deleteriously affected by the acid washing and etching, and thus the silicon particles in the shell 22 may have a diameter ranging from about 2 nm to about 30 nm and the pores 20 in the shell 22 may have a diameter ranging from about 2 nm to about 30 nm. It is to be understood that the pore size distribution of the silicon mesoporous shell 22 may be different than silicon dioxide mesoporous shell 16, as evidenced, for example, in FIGS. 5B and 6B (discussed below). This change in pore size distribution may be the result of partial agglomeration of the primary particles 18. These pores 20 in the shell 22 also contribute to the ability of the particle 10 to accommodate the volume change during charging/discharging.

The overall size (i.e., diameter) of the particle 10 ranges from about 250 nm to about 3 µm. The surface area of the particle 10 is relatively large. In an example, the BET surface area ranges from about 100 $m^2/g$ to about 600 $m^2/g$. As one example, the BET surface area of the particle 10 is 550 $m^2/g$.

The mesoporous, hollow silicon particles 10 disclosed herein may be used in anodes. These anodes may be particularly suitable for use in lithium ion batteries for the reasons mentioned herein. In an example, the anode includes the mesoporous, hollow silicon particles 10, sodium alginate, and graphene. The sodium alginate may be used to bind the particles 10 and the graphene together. The graphene may be desirable because it acts as a conductive additive, exhibits favorable lithium intercalation and deintercalation characteristics, and can store lithium in quantities that produce a relatively high energy density. Binders other than sodium alginate may be used, including, for example, polyvinylidene fluoride (PVDF), poly(acrylic acid), carboxymethylcellulose, polyacrylonitrile, polyethylene oxide, polyethylene, polypropylene, polytetrafluoroethylene (PTFE), polybutadiene, polystyrene, polyalkyl acrylates and methacrylates, ethylene-(propylene-diene-monomer)-copolymer (EPDM) rubber, copolymers of styrene and butadiene, and mixtures of these polymers. Other conductive additives may be used instead of, or in addition to the graphene. Examples of other suitable conductive additives include carbon black, carbon nanotubes, conductive polymers, or combinations thereof.

In an example, the anode includes from about 30 wt % to about 80 wt % of the particles 10, from about 10 wt % to about 20 wt % of the binder, and from about 10 wt % to about 60 wt % of the conductive additive. In an example, the anode includes about 64 wt % of the particles 10, about 15 wt % of the sodium alginate or other binder(s), and about 21 wt % of the graphene or other conductive additive(s). An example of the anode including the mesoporous, hollow silicon particles 10 is shown in FIG. 2 at reference numeral 26.

Figure 2:
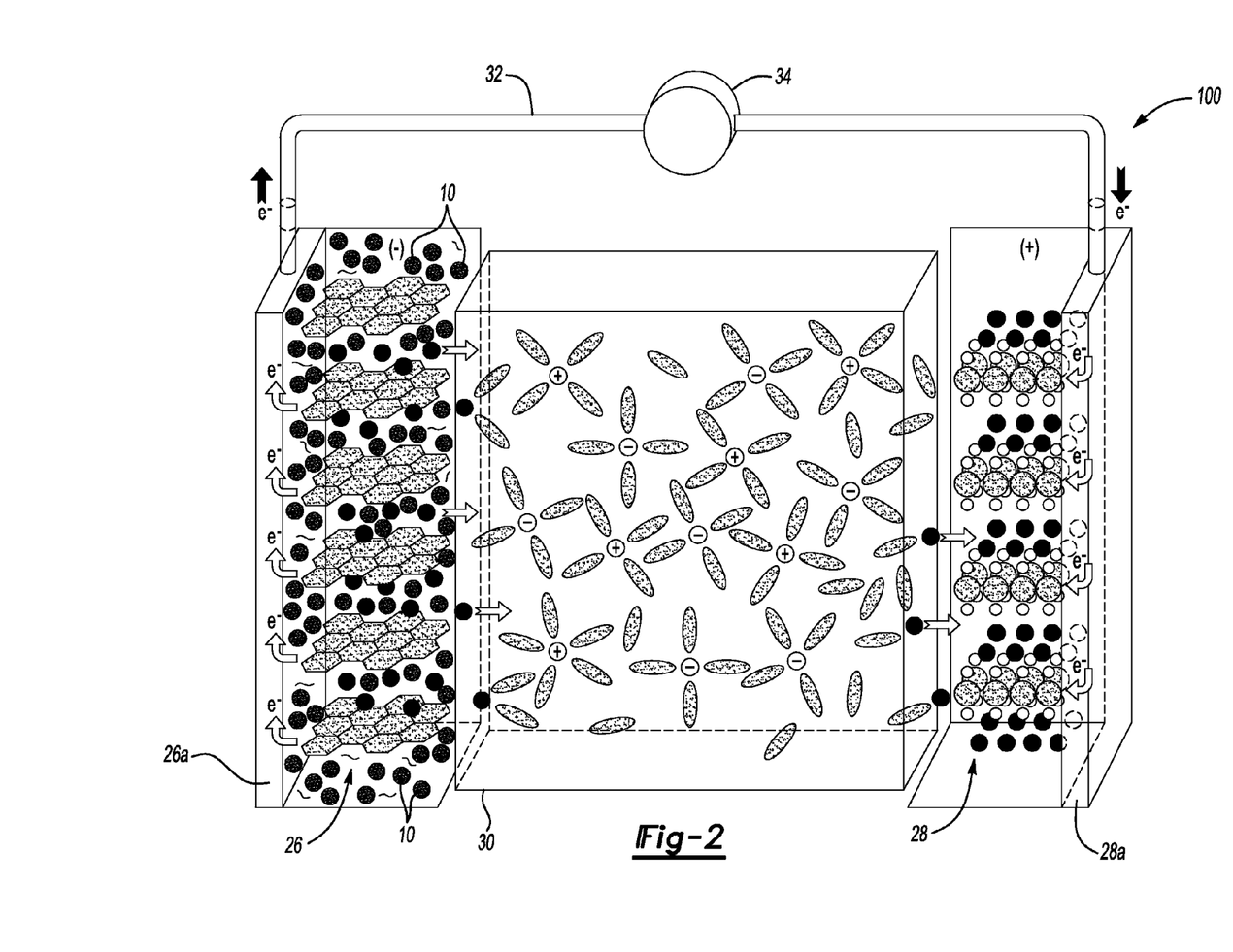
FIG. 2 is a perspective schematic view of an example of a lithium ion battery, including an example of an anode formed with the mesoporous, hollow silicon particles disclosed herein.

More particularly, FIG. 2 illustrates an example of a secondary lithium ion battery 100. The battery 10 generally includes the anode 26, a cathode 26, a microporous polymer separator 30 sandwiched between the two electrodes 26, 28, and an interruptible external circuit 32 that connects the anode 26 and the cathode 28. Each of the anode 26, the cathode 28, and the microporous polymer separator 30 are soaked in an electrolyte solution capable of conducting lithium ions. The microporous polymer separator 30, which operates as both an electrical insulator and a mechanical support, is sandwiched between the anode 26 and the cathode 28 to prevent physical contact between the two electrodes 26, 28 and the occurrence of a short circuit. The microporous polymer separator 30, in addition to providing a physical barrier between the two electrodes 26, 28, ensures passage of lithium ions (identified by the black dots and by the open circles having a (+) charge in FIG. 2) and related anions (identified by the open circles having a (−) charge in FIG. 2) through the electrolyte solution filling its pores. This helps ensure that the lithium ion battery 100 functions properly. A negative-side current collector 26a and a positive-side current collector 28a may be positioned in contact with the anode 26 and the cathode 28, respectively, to collect and move free electrons to and from the external circuit 32.

The lithium ion battery 100 may support a load device 34 that can be operatively connected to the external circuit 32. The load device 34 may be powered fully or partially by the electric current passing through the external circuit 32 when the lithium ion battery 100 is discharging. While the load device 34 may be any number of known electrically-powered devices, a few specific examples of a power-consuming load device include an electric motor for a hybrid vehicle or an all-electrical vehicle, a laptop computer, a cellular phone, and a cordless power tool. The load device 34 may also, however, be a power-generating apparatus that charges the lithium ion battery 100 for purposes of storing energy. For instance, the tendency of windmills and solar panels to variably and/or intermittently generate electricity often results in a need to store surplus energy for later use.

The lithium ion battery 100 can include a wide range of other components that, while not depicted here, are nonetheless known to skilled artisans. For instance, the lithium ion battery 100 may include a casing, gaskets, terminals, tabs, and any other desirable components or materials that may be situated between or around the anode 26 and the cathode 28 for performance-related or other practical purposes. Moreover, the size and shape of the lithium ion battery 100, as well as the design and chemical make-up of its main components, may vary depending on the particular application for which it is designed. Battery-powered automobiles and hand-held consumer electronic devices, for example, are two instances where the lithium ion battery 100 would most likely be designed to different size, capacity, and power-output specifications. The lithium ion battery 100 may also be connected in series and/or in parallel with other similar lithium ion batteries to produce a greater voltage output and current (if arranged in parallel) or voltage (if arranged in series) if the load device 34 so requires.

The lithium ion battery 100 can generate a useful electric current during battery discharge by way of reversible electrochemical reactions that occur when the external circuit 32 is closed to connect the anode 26 and the cathode 28 at a time when the anode 26 contains a sufficiently higher relative quantity of intercalated lithium. The chemical potential difference between the cathode 28 and the anode 26 (ranging from approximately 2.5 to 5.0 volts, depending on the exact chemical make-up of the electrodes 26, 28) drives electrons produced by the oxidation of intercalated lithium at the anode 26 through the external circuit 32 towards the cathode 28. Lithium ions, which are also produced at the anode 26, are concurrently carried by the electrolyte solution through the microporous polymer separator 30 and towards the cathode 28. The electrons flowing through the external circuit 32 and the lithium ions migrating across the microporous polymer separator 30 in the electrolyte solution eventually reconcile and form intercalated lithium at the cathode 28. The electric current passing through the external circuit 32 can be harnessed and directed through the load device 34 until the intercalated lithium in the anode 26 is depleted and the capacity of the lithium ion battery 100 is diminished.

The lithium ion battery 100 can be charged or re-powered at any time by applying an external power source to the lithium ion battery 100 to reverse the electrochemical reactions that occur during battery discharge. The connection of an external power source to the lithium ion battery 100 compels the otherwise non-spontaneous oxidation of intercalated lithium at the cathode 28 to produce electrons and lithium ions. The electrons, which flow back towards the anode 26 through the external circuit 32, and the lithium ions, which are carried by the electrolyte across the microporous polymer separator 30 back towards the anode 26, reunite at the anode 26 and replenish it with intercalated lithium for consumption during the next battery discharge cycle. The external power source that may be used to charge the lithium ion battery 100 may vary depending on the size, construction, and particular end-use of the lithium ion battery 100. Some suitable external power sources include a battery charger plugged into an AC wall outlet and a motor vehicle alternator.

As mentioned above, the anode 26 includes the mesoporous, hollow silicon particles 10. These particles 10 are a lithium host material that can sufficiently undergo lithium intercalation and deintercalation while functioning as the negative terminal of the lithium ion battery 100. The anode 26 may also include a binder material to structurally hold the lithium host material together, and an electron conduction material, such as the previously mentioned graphene. The negative-side current collector 26a may be formed from copper or any other appropriate electrically conductive material known to skilled artisans.

The cathode 28 may be formed from any lithium-based active material that can sufficiently undergo lithium intercalation and deintercalation while functioning as the positive terminal of the lithium ion battery 100. The cathode 28 may also include a polymer binder material to structurally hold the lithium-based active material together. One common class of known materials that can be used to form the cathode 28 is layered lithium transitional metal oxides. In various examples, the cathode 28 may include an active material intermingled with a polymeric binder and mixed with a high surface area carbon, such as acetylene black, to ensure electron conduction between the current collector 28a and the active material particles of the cathode 28. The active material may be made of at least one of spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). The polymeric binder may be made of at least one of polyvinylidene fluoride (PVdF), an ethylene propylene diene monomer (EPDM) rubber, or carboxymethyl cellulose (CMC)). Other lithium-based active materials may also be utilized besides those just mentioned. Examples of those alternative materials include lithium nickel-cobalt oxide ($LiNi_xCo_{1-x}O_2$), aluminum stabilized lithium manganese oxide spinel ($Li_xMn_{2-x}Al_yO_4$), and lithium vanadium oxide ($LiV_2O_5$). The positive-side current collector 28a may be formed from aluminum or any other appropriate electrically conductive material known to skilled artisans.

Any appropriate electrolyte solution that can conduct lithium ions between the anode 26 and cathode 28 may be used in the lithium ion battery 100. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 100 as well as how to manufacture or commercially acquire them. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, and mixtures thereof. These and other similar lithium salts may be dissolved in a variety of organic solvents such as cyclic carbonates (ethylene carbonate, propylene carbonate, butylene carbonate), linear carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 30 includes, or in some examples, is a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP.

In another example, the membrane of the microporous polymer separator 30 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 30 is poly(p-hydroxybenzoic acid).

In yet another example, the membrane of the microporous separator 30 may be chosen from a combination of the polyolefin (such as PE and/or PP) and one or more of the polymers for the separator 30 listed above.

The microporous polymer separator 30 may contain a single layer or a multi-layer laminate fabricated from either a dry or wet process. For example, in one example, a single layer of the polyolefin may constitute the entirety of the microporous polymer separator 30 membrane. In another example, a single layer of one or a combination of any of the polymers from which the microporous polymer separator 30 may be formed (e.g., the polyolefin and/or one or more of the other polymers listed above for the separator 30) may constitute the entirety of the separator 30. As another example, however, multiple discrete layers of similar or dissimilar polyolefins and/or polymers for the separator 30 may be assembled into the microporous polymer separator 30. In one example, a discrete layer of one or more of the polymers may be coated on a discrete layer of the polyolefin for the separator 30. Further, the polyolefin (and/or other polymer) layer, and any other optional polymer layers, may further be included in the microporous polymer separator 30 as a fibrous layer to help provide the microporous polymer separator 30 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable polymer separators 30 include those that have a ceramic layer attached thereto, and those that have ceramic filler in the polymer matrix (i.e., an organic-inorganic composite matrix).

To further illustrate the present disclosure, examples are given herein. It is to be understood that these examples are provided for illustrative purposes and are not to be construed as limiting the scope of the disclosed example(s).

EXAMPLE

Mesoporous, hollow silicon particles were formed via the method disclosed herein. First, solid core/mesoporous shell (SCMS) $SiO_2$ spheres were produced by the simultaneous hydrolyzation and condensation of tetraethoxysilane (TEOS) and octadecyltrimethoxysilane, followed by the removal of any organic species. More particularly, absolute ethanol (117 g, 2.54 mol), deionized water (20 g, 1.12 mol) and aqueous ammonia (32 wt %, 5.64 g, and 0.34 mol) were mixed in a 250 ml flask. After heating to 303 K, TEOS (11.2 g, 0.052 mol) was added rapidly, and the mixture was stirred. After 1 hour, a mixture of TEOS (9.34 g, 0.044 moles) and n-octadecyltrimethoxysilane (3.536 g, 0.00944 moles) was added dropwise over a period of 20 minutes. After the mixture was added, the solution was kept at ambient temperature for 12 hours. The resulting white powder was obtained by centrifuge, and then the white powder was calcined in air for a period of 6 hour at 823 K (1K/min). Some of the calcined white powder (i.e., silicon dioxide spheres) was used as the comparative particles.

The remainder of the calcined white powder (i.e., $SiO_2$ powder) was used to form the mesoporous, hollow silicon particles. 0.5 g of $SiO_2$ power was dispersed in ethanol and cast onto a ceramic plate which was 1 cm away from 1 g of Mg powder layer dispersed at the bottom of a standard steal chamber. After the chamber was transferred into the tubular furnace, the temperature was ramped to 680° C. at the rate of 10° C./min, and the $SiO_2$ powder was soaked in Mg vapor for 5 hours under argon. The product was washed with dilute mixed acid (acetic acid:hydrochloric acid=4:1), followed by etching in a hydrofluoric acid solution. Finally, a brown, silicon powder (i.e., the mesoporous, hollow silicon particles) was obtained under vacuum drying at room temperature, and the Si powder was stored in a glovebox.

Figure 3:
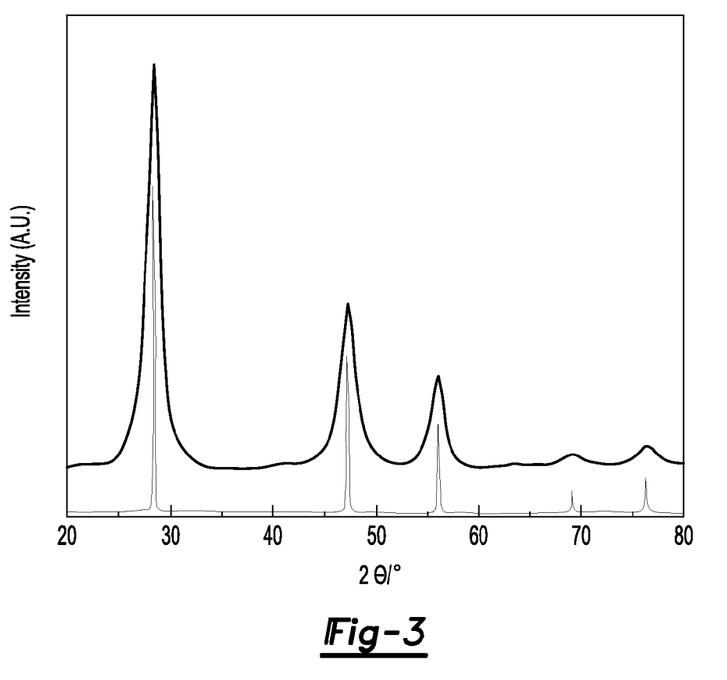
FIG. 3 is an X-ray diffraction (XRD) spectra of an example of the mesoporous, hollow silicon particles disclosed herein.
Figure 4:
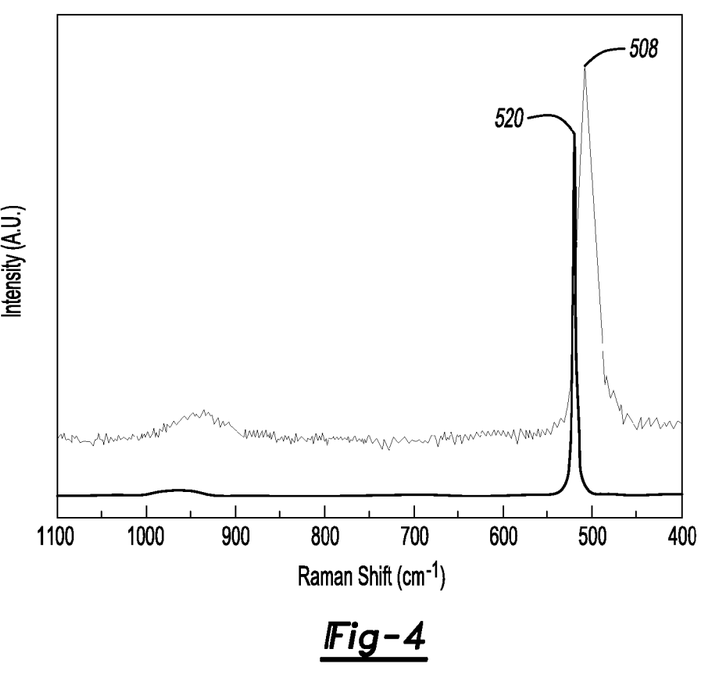
FIG. 4 is a Raman spectra of the example of the mesoporous, hollow silicon particles.

The porous, hollow silicon particles were characterized using X-ray diffraction and Raman spectroscopy. These results are shown in FIGS. 3 and 4, respectively. The X-ray diffraction pattern shown in FIG. 3 and the peaks of the Raman spectra shown in FIG. 4 are characteristic of porous silicon.

Figure 5A:
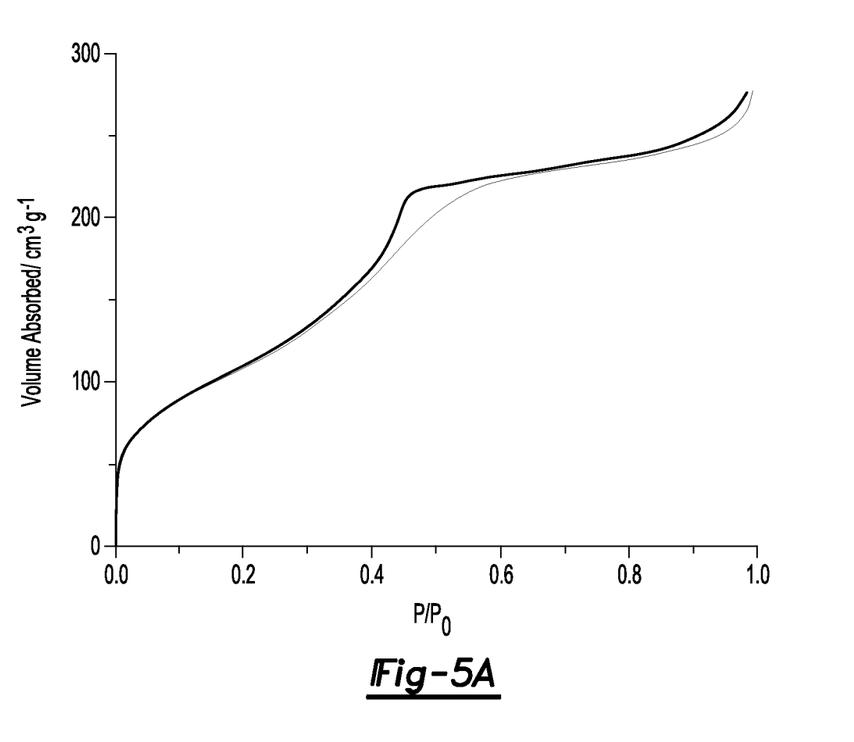
FIG. 5A is a graph illustrating the $N_2$ isotherm of comparative silicon dioxide spheres having a silicon dioxide solid core and a silicon dioxide mesoporous shell.
Figure 6A:
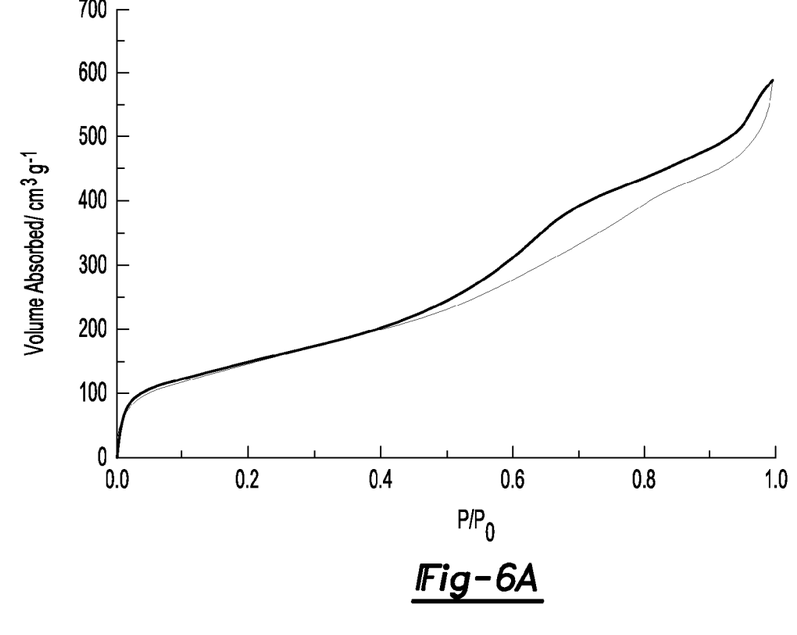
FIG. 6A is a graph illustrating the $N_2$ isotherm of the example of the mesoporous, hollow silicon particles.

The mesoporous, hollow silicon particles and the comparative particles were exposed to liquid nitrogen at 77K, and the amount absorbed was measured. FIGS. 5A and 6A are the $N_2$ isotherms for the comparative particles and the mesoporous, hollow silicon particles, respectively. The BET surface area was then determined. The comparative particles had an average BET surface area of 405 $m^2/g$ and the mesoporous, hollow silicon particles had an average BET surface area of 550 $m^2/g$. The increase in surface area may be attributed to the removal of the solid core.

Figure 5B:
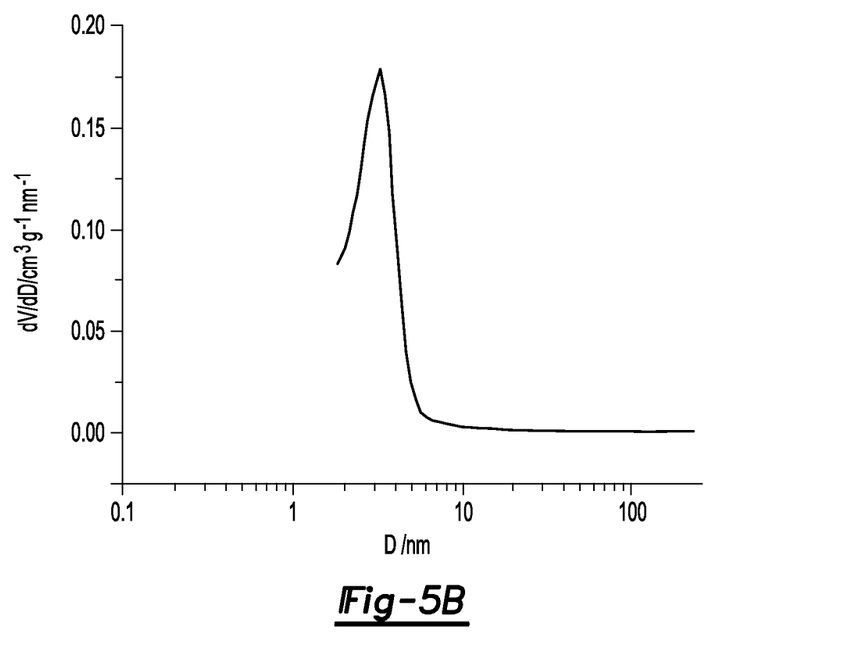
FIG. 5B is a graph illustrating the pore size distribution of the comparative silicon dioxide spheres.
Figure 6B:
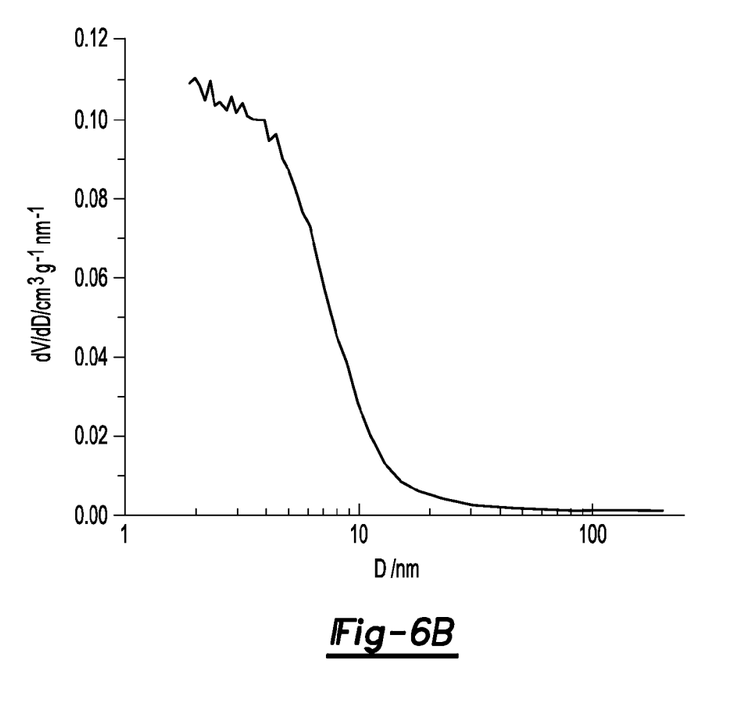
FIG. 6B is a graph illustrating the pore size distribution of the example of the mesoporous, hollow silicon particles.

FIGS. 5B and 6B illustrate the pore size distributions for the comparative particles and the mesoporous, hollow silicon particles, respectively. As illustrated in FIG. 5B, most of the comparative particles had a pore diameter of about 3.5 nm, whereas the mesoporous, hollow silicon particles had a broader range of pore diameters. The change in particle size distribution may be due to partial agglomeration of the primary nanoparticles.

Figure 7:
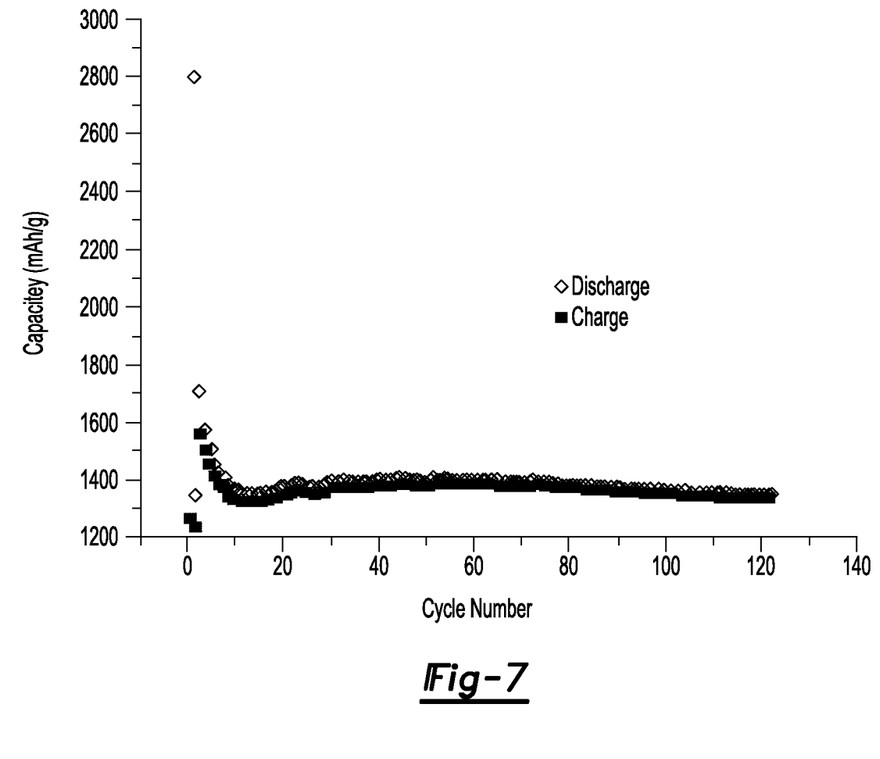
FIG. 7 is a graph illustrating the galvanostatic cycling performance of an anode formed with an example of the mesoporous, hollow silicon particles disclosed herein.

A mesoporous, hollow silicon particle electrode was made with 63.75 wt % of the mesoporous, hollow silicon particles, 15 wt % of sodium alginate, and 21.25 wt % of graphene. The galvanostatic cycling performance of the electrode was tested in 1M $LiPF_6$ (ethylene carbonate:dimethyl carbonate (EC:DEC) 1:1) plus 10 wt % fluorinated ethylene carbonate (FEC) at 30° C. The electrode was evaluated using coin cells with a metallic Li under the following test conditions: 0.05 C and 1 to 0.07 V for the $1^{st}$ and $2^{nd}$ cycles, and 0.1 C and 1 to 0.01V for the $3^{rd}$ through $100^{th}$ cycles. These results are shown in FIG. 7. The results are relatively consistent for both charge and discharge over the various cycles.

It is to be understood that the ranges provided herein include the stated range and any value or sub-range within the stated range. For example, a range from about 250 nm to about 3 μm should be interpreted to include not only the explicitly recited limits of about 250 nm to about 3 μm, but also to include individual values, such as 500 nm, 1 μm, 2.5 μm, etc., and sub-ranges, such as from about 325 nm to about 2.75 μm; from about 750 nm to about 2 μm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A particle, comprising:
   a hollow core having a diameter ranging from about 200 nm to about 1.5 μm; and
   a silicon mesoporous shell surrounding the hollow core, wherein the silicon mesoporous shell includes a plurality of pores having an average diameter ranging from about 2 nm to about 30 nm;
   the particle having a surface area ranging from about 100 $m^2/g$ to about 600 $m^2/g$.

2. The particle as defined in claim 1 wherein a diameter of the particle ranges from about 250 nm to about 3 μm.

3. An anode for a lithium ion battery, comprising:
   mesoporous, hollow silicon particles, each of the mesoporous, hollow silicon particles including:
      a hollow core having a diameter ranging from about 200 nm to about 1.5 μm; and
      a silicon mesoporous shell surrounding the hollow core, wherein the silicon mesoporous shell includes a plurality of pores having an average diameter ranging from about 2 nm to about 30 nm;
   sodium alginate; and
   graphene.

4. The anode as defined in claim 3 wherein:
   the mesoporous, hollow silicon particles make up about 64 wt % of the anode;
   the sodium alginate makes up about 15 wt % of the anode; and
   the graphene makes up about 21 wt % of the anode.

5. The anode as defined in claim 3 wherein a diameter of each of the particles ranges from about 250 nm to about 3 μm.

6. The particle as defined in claim 1 wherein the average diameter of the plurality of pores of the silicon mesoporous shell ranges from about 2 nm to about 10 nm.

7. The particle as defined in claim 3 wherein the average diameter of the plurality of pores of the silicon mesoporous shell ranges from about 2 nm to about 10 nm.

\* \* \* \* \*